United States Patent [19]

Levy et al.

[11] Patent Number: 4,584,693
[45] Date of Patent: Apr. 22, 1986

[54] QPSK SYSTEM WITH ONE CYCLE PER BAUD PERIOD

[75] Inventors: Michel Levy, Gometz La Ville; Serge Surie, L'Hay Les Roses, both of France

[73] Assignee: Compagnie Industrielle des Telecommunications CIT-Alcatel, Paris, France

[21] Appl. No.: 554,668

[22] Filed: Nov. 23, 1983

[30] Foreign Application Priority Data

Nov. 23, 1982 [FR] France .................................. 82 19562

[51] Int. Cl.⁴ .............................................. H04L 27/18
[52] U.S. Cl. ............................................ 375/54; 375/56; 375/85; 375/86; 375/110; 329/112; 332/16 R; 307/269
[58] Field of Search ....................... 375/54, 85, 52, 53, 375/55, 56, 83, 86, 110, 49; 329/112, 120; 307/269, 358; 332/16 R

[56] References Cited

U.S. PATENT DOCUMENTS

| 3,419,804 | 12/1968 | Gorog et al. | 375/55 |
| 3,437,932 | 4/1969 | Malakoff | 375/49 |
| 3,619,503 | 11/1971 | Ragsdale | 375/54 |
| 3,665,328 | 5/1972 | Widl | 375/85 |
| 3,745,250 | 7/1973 | Gerst | 375/85 |
| 3,810,155 | 5/1974 | Widl et al. | 340/347 DD |
| 3,816,657 | 6/1974 | Fletcher et al. | 375/110 |
| 3,916,324 | 10/1975 | Shuda | 375/54 |
| 3,924,186 | 12/1975 | Gordy et al. | 375/54 |
| 3,938,052 | 2/1976 | Glasson et al. | 375/85 |
| 3,947,767 | 3/1976 | Koike et al. | 375/20 |
| 4,292,593 | 9/1981 | de Jager et al. | 375/25 |

OTHER PUBLICATIONS

"Trigonometric Functions", Electronics Designers' Handbook, L. J. Giacoletto, 1977, pp. 1-28, 1-29.

Primary Examiner—Robert L. Griffin
Assistant Examiner—Raymond C. Glenny
Attorney, Agent, or Firm—Sughrue, Mion, Zinn, Macpeak & Seas

[57] ABSTRACT

In a QPSK system using one cycle of a squared-off sinusoid per Baud period to represent the data dibits, the following are disclosed:

(1) a direct detection circuit using samples taken only during the second and third quarters of the Baud period;
(2) timing recovery by recognition of the opposite polarity of any QPSK signal compared to a half-Baud-delayed version of itself; and
(3) an encoding scheme wherein only one of the two dibits is differentially encoded.

4 Claims, 4 Drawing Figures

QPSK SYSTEM WITH ONE CYCLE PER BAUD PERIOD

The present invention relates to synchronous data transmission with the particular aim of providing a digital connection between a telephone exchange and subscriber equipment via existing line plant. The invention relates more particularly to data transmission systems using a two-level base band signal obtained by means of a code that results from a superposition of the biphase L and modified biphase codes.

BACKGROUND OF THE INVENTION

The biphase L code is sometimes known as the "Manchester" code and transforms a sequence of bits which are made available for transmission at a rate $1/T$ into a transmission signal which comprises a succession of non-overlapping two-level signals each of which lasts for one Baud period T and each of which has a transition in the middle of each Baud period in a direction which depends on the value of the bit to be encoded. This transmission signal is obtained by combining successive bits of the sequence to be transmitted with the clock signal driving said sequence by means of an exclusive-OR type of logic gate.

The modified biphase code differs from the biphase L code in that the clock signal is phase shifted by $\pi/2$.

The biphase L and the modified biphase codes may be considered as being double side band modulations of the following two Walsh functions in quadrature:

$$\text{sign }(\sin(2\pi t/T)); \text{ sign }(\cos(2\pi t/T))$$

and they may be combined by quadrature modulation to define a code which is referred to hereinafter as Wacx code and which gives a line signal $z'(t)$ which may be expressed by the following equation in which a linear scale factor is omitted:

$$z'(t) = \sum_K [(a_K + b_K)\text{ sign }(\cos(2\pi t/T)) + (b_K - a_K)\text{ sign }(\sin(2\pi t/T))]\, d(t - KT) \quad (1)$$

where $a_K$ and $b_K$ are two synchronous sequences of binary data to be transmitted providing values of $\pm 1$ at a rate $1/T$, and where $d(t-KT)$ is a time function having the value unity for the K-th Baud interval and nill otherwise. This Wacx code has the advantage of doubling the data rate compared with the biphase and modified biphase codes, without doubling the occupied bandwidth. A detailed study of this code is to be found in the Applicants' French patent application No. 82 02227 filed Feb. 11, 1982.

Preferred embodiments of the present invention provide synchronous data transmission equipment using the Wacx code, which equipment is simple and cheap, and suitable for use in providing a data transmission link over existing line plant between a telephone exchange and subscriber equipment.

SUMMARY OF THE INVENTION

The present invention provides synchronous data transmission equipment in which data available in binary form is assembled into successive groups of two bits each, which groups are transmitted one after the other during successive equal time intervals of duration T (where T is called the Baud period) by means of signal elements each of which occupies one Baud period and each of which takes, in the base band, one out of four possible shapes defined by the functions:

$$\pm \text{ sign }(\sin(2\pi t/T)); \pm \text{ sign }(\cos(2\pi t/T))$$

which shapes correspond to the four possibles values of a group.

In one aspect the equipment includes a direct detection circuit at the reception end for recognizing the shapes of the received signal elements on the basis of samples taken during the second and third quarters of the Baud periods.

In addition to being extremely simple to embody, this direct detection has the advantage of taking account only of the middle portions of the signal elements which turn out to be portions which are the least distorted when the signal elements are transmitted in base band over a two-wire line.

In another aspect, the equipment includes a clock rate recovery circuit at the reception end for recovering the Baud rate from the received signals on the basis of a comparison between two versions thereof, one version being delayed relative to the other by half of one Baud period.

In a variant, in which the shape of the signal element which encodes the two bits is obtained by a first selection between functions having the form:

$$\text{sign }(\sin(2\pi t/T)); \text{ sign }(\cos(2\pi t/T))$$

said first selection being determined by one of the bits in each group, and by a second selection between complementing or not complementing the selected shape function, said second selection being determined by the other one of the bits in each group, the equipment includes a differential encoder at the transmission end operating on said other bit in each group before its application to select the complemented or the non-complemented version of the selected shape function, and a differential decoder at the reception end for returning said other bit to its initial shape after its differential shape has been detected by recognising the complemented or non-complemented nature of the received signal element.

The differential encoding and decoding ensures that line reversals on the two-wire circuit over which signal elements are being transmitted in base band do not alter the values detected at the reception end for the transmitted data.

BRIEF DESCRIPTION OF THE DRAWINGS

An embodiment of the invention is described by way of example with reference to the accompanying drawings, in which.

MORE DETAILED DESCRIPTION

The system described below for transmitting data over base band is insensitive to polarity reversals of the transmission line and which uses a Wacx code having a Baud period of duration T to transmit a sequence of isochronous data bits $\{a_i\}$ which follow one another at a rate $2/T$.

As can be seen from the expression for its line signal (equation 1), the Wacx code causes a group of two bits $a_K$ and $b_K$ each of which may take values $\pm 1$ to correspond to a signal element of duration T which is capable of assuming any one of four possible shapes resulting from a first selection between two functions having the form:

$$\text{sign } (\sin(2\pi t/T)); \text{ sign } (\cos(2\pi t/T))$$

and from a second selection between the complemented or the uncomplemented versions of said shape functions. Since the selection between the shape functions is insensitive to polarity reversals on a two-wire transmission line, it is advantageous to use it directly to encode each even bit or each odd bit in the sequence $\{a_i\}$. This means that the selection between the complemented or uncomplemented version is used to encode the other bit. Since this second selection is sensitive to polarity reversals on two-wire transmission lines, the other bit is taken to be equal to a differential encoding of each odd bit or each even bit in the sequence $\{a_i\}$. These various considerations lead to the bits $a_K$ and $b_K$ being determined as a function of the terms in the sequence $\{a_i\}$ in the following manner, where the index j is defined as being equal to $i/2$ for even i and to $(i+1)/2$ for odd i:

$$\begin{cases} a_j = a_{2j-1} \cdot b_j \\ b_j = a_{2j} \cdot b_{j-1} \end{cases} \quad (2)$$

which appears more clearly by expressing the base band signal $z'(t)$ resulting from the Wacx encoding in the form:

$$z'(t) = \sum_K b_K [(1 + a_K b_K) \text{ sign } (\cos(2\pi t/T)) +$$

$$(1 - a_K b_K) \text{ sign } (\sin(2\pi t/T))] d(t - KT)$$

which can be expressed in terms of the sequence $\{a_i\}$ as follows:

$$z'(t) = \sum_j b_{j-1} a_{2j} [(1 + a_{2j-1}) \text{ sign } (\cos(2\pi t/T)) +$$

$$(1 - a_{2j-1}) \text{ sign } (\sin(2\pi t/T))] d(t - jT)$$

Figure 1:
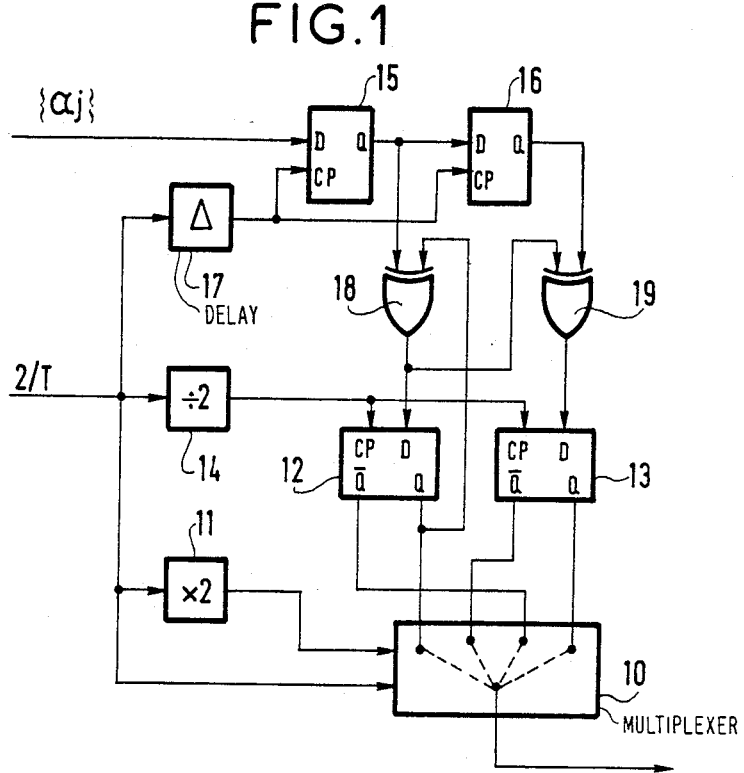
FIG. 1 shows an encoder.

FIG. 1 shows an encoder which provides this form of code. This waveform is synthesised each quarter Baud period by taking advantage of the fact that it may also be written:

$$z'(t) = \sum_K [b_K (\text{sign } (\cos(2\pi t/T)) + \text{sign } (\sin(2\pi t/T))) +$$

$$a_K(\text{sign } (\cos(2\pi t/T)) - \text{sign } (\sin(2\pi t/T)))] d(t - KT)$$

or, taking into account in addition the multiplicative factor of $\frac{1}{2}$ which ought to be applied to the expression for the second member:

$$z'(t) = \sum_K b_K g(t - KT - (T/4)) - a_K g(t - KT - (2T/4)) -$$

$$b_K g(t - KT - (3T/4)) + a_K g(t - KT - (4T/4))$$

by replacing the function $g(t-KT-(mT/4))$ with a function which is equal to unity in the time interval [KT+((m−1)T/4), KT+(mT/4)] and zero the remainder of the time and which shows that the base band signal resulting from Wacx encoding takes the following values during a K-th Baud period: $b_K$ during the first quarter of the Baud period, the value $-a_K$ during the second quarter, $-b_K$ during the third quarter, and $a_K$ during the last quarter. Taking equations (2) into account, the base band signal resulting from Wacx encoding can thus be generated during a j-th Baud period by giving it the following values during the successive quarters thereof:

$$a_{2j} \cdot b_{j-1}; \; -a_{2j-1} \cdot b_j; \; -a_{2j} \cdot b_{j-1}; \; a_{2j-1} \cdot b_{j-1}$$

In binary logic having values 0 and 1, which is the form in which the sequence of bits $\{a_i\}$ is available, a product corresponds to the "exclusive-OR" function, and a change of sign to complementation.

The encoder comprises a multiplexer 10 having four inputs 0, 1, 2 and 3, for generating an output signal from four different signals, each of which serves to define the values of the signal $z'(t)$ during a respective quarter of the Baud period. The multiplexer 10 scans each of its inputs for one quarter of the Baud period in the order 0, 1, 2, 3 by means of two address bits applied in parallel, one of the address bits being clocked at the data rate $2/T$ of the sequence $\{a_i\}$ and the other being clocked at twice that rate, ie. at $4/T$, which rate is deduced from the preceding rate by means of a rate doubler circuit 11. The output from the multiplexer constitutes the output from the encoder and it is intended for connection to one end of a two-wire transmission line by means of a conventional matching circuit.

A D-type bistable 12 has its Q and $\overline{Q}$ outputs connected to the inputs 0 and 2 of the multiplexer 10 and serves to store the value $a_{2j} \cdot b_{j-1}$ during each Baud period. A second D-type bistable 13 has its Q and $\overline{Q}$ outputs connected to the inputs 3 and 1 respectively of the multiplexer 10 and stores the value $a_{2j-1} \cdot b_j$ during each Baud period. These two bistables 12 and 13 are clocked at the beginning of each Baud period by a clock signal generated by a divide by two circuit 14 driven by the clock rate $2/T$ of the sequence of bits $\{a_i\}$.

Two further D-type bistables 15 and 16 act as a series to parallel converter which provides the values $a_{2j}$ and $a_{2j-1}$ simultaneously. These bistables are clocked at twice the rate of the bistables 12 and 13, but with a slight time delay relative thereto provided by means of a delay circuit 17 through which the $2/T$ data rate clock signal passes. The first D-type bistable 15 has its D input connected to receive the sequence of data $\{a_i\}$ as applied to the coder, and on its Q output it delivers the term $a_{2j}$ over the end of every second half Baud period plus the period $\Delta$ at the beginning of the next first half Baud period. The second bistable 16 has its D input connected to the Q output of the first bistable 15 and on its Q output it delivers the term $a_{2j-1}$ over the end of every second half Baud period plus the period $\Delta$ at the beginning of the next first half Baud period.

A two input exclusive-OR gate 18 serves in conjunction with the bistable 12 to provide differential encoding of the even terms in the data sequence $\{a_i\}$. Its output is connected to the D input of the bistable 12. One of its inputs is connected to the Q output from the bistable 15 delivering the term $a_{2j}$ while its other input is connected in a feedback loop to the Q output from the bistable 12 which delivers the term $b_{j-1}$.

Another two input exclusive-OR gate 19 has one of its inputs connected to the Q output of the bistable 16 which delivers the term $a_{2j-1}$ and its other input connected to the output of the first exclusive-OR gate 18 which delivers the term $b_j$. The said other exclusive-OR gate 19 generates the term $a_{2j-1} \cdot b_j$ and applies it to the D input of the bistable 13.

Since the four possible shapes of signal element resulting from Wacx code correspond, as mentioned above, to the functions:

$$\pm \text{sign}(\sin(2\pi t/T)); \pm \text{sign}(\cos(2\pi t/T))$$

they may be distinguished from one another by observing them over a period of duration T/2. In the succession of signal elements over time, pulses appear or do not appear for durations of T/4, 2T/4, 3T/4 and T. The pulses or absences of pulse of width T/4 are those which are most deformed by transmission lines because of their low-pass behaviour. Since these pulses only appear at the beginning or the end of a Baud period it is advantageous to ignore them while distinguishing between the four possible shapes of a signal element, ie. by distinguishing on the basis of a study of the middle half period in each Baud period.

Figure 2:
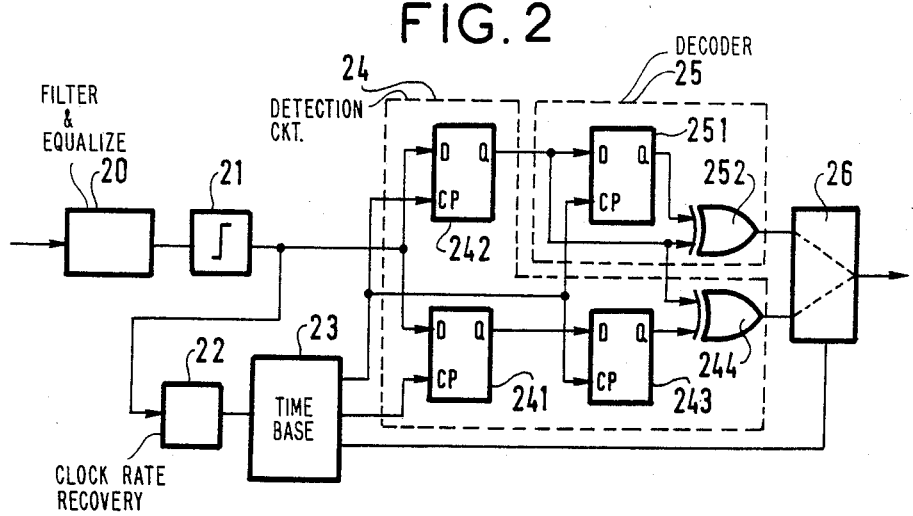
FIG. 2 shows the structure of a direct detection receiver suitable for receiving the signal generated by the FIG. 1 encoder.

FIG. 2 shows a direct detection receiver structure for recovering the values of the transmitted data sequence $\{a_i\}$ on the basis of samples taken in the second and third quarters of the Baud period of each Wacx encoded signal element. At its input end this circuit includes a filter and line equalization circuit 20 followed by a hard limiter circuit 21 which restores the received signal to binary form. The hard limiter circuit 21 is followed by a clock rate recovery circuit 22 which synchronizes a time base 23 and a direct detection circuit 24 which, under the control of the time base 23, delivers the odd terms in the data sequence $\{a_i\}$ plus the differentially encoded even terms thereof. A differential decoder 25 delivers the even terms of the data sequence $\{a_i\}$, and a multiplexer 26 recombines the odd and even terms of said sequence under the control of the time base 23.

The direct detection circuit 24 comprises three D-type bistables, 241, 242 and 243 together with an exclusive-OR gate 244. The D-type bistables 241 and 242 have their D inputs connected to the output from the hard limiter circuit 21 and their clock inputs CP are connected to outputs from the time base 23. They serve, under the control of the time base 23, to sample the received signal, with the bistable 241 sampling in the middle of the second quarter of each Baud period when the received signal has the value $a_{2j-1} \cdot b_j$ or its inverse depending on whether line polarity has been reversed, and with bistable 242 sampling in the middle of the third quarter of each Baud period when the received signal has the value $a_{2j} \cdot b_{j-1}$ which is also equal to $b_j$ or to its inverse depending on whether line polarity has been reversed. The third D-type bistable 243 has its clock input CP connected in parallel with the clock input to the second D-type bistable 242 and has its D input connected to the Q output from the bistable 241, thereby delaying the sample taken during the second quarter of each Baud period by one quarter of a Baud period in order to synchronize said sample with the sample taken during the third quarter of each Baud period. The exclusive-OR gate 244 has two inputs connected to the Q outputs of the second and third bistables 242 and 243 respectively to multiply the values $b_j$ and $a_{2j-1}$ (or their inverses) together available at the outputs from said bistables, thereby generating the odd terms in the data sequence $\{a_i\}$.

The differential decoder 25 comprises a D-type bistable 251 having its clock input connected to the clock input to the bistable 242 in the direct detection circuit 24 and having its D input connected to the Q output from said bistable 242. The decoder 25 further comprises an exclusive-OR logic gate 252 having two inputs, one of which is connected to the D input of the bistable 251 and the other of which is connected to the Q output therefrom. The bistable 251 provides a delay of one Baud period. At its input is receives the value $b_j$ or its inverse, and at its Q output it delivers the value $b_{j-1}$ or its inverse. The exclusive-OR logic gate 252 multiplies these two values $b_j$ and $b_{j-1}$ together, ie. $o_{2j} \cdot b_{j-1}$ and $b_{j-1}$ or their inverses as available at the D input and the Q output of the bistable 252 and thus generates the even terms of the sequence $\{a_i\}$.

The multiplexer 26 has two data inputs connected to the outputs from the exclusive-OR gates 244 and 252 respectively. It has an addressing input which receives a clock signal at the Baud frequency and having transitions in the middles of the first and third quarters of each Baud period in the received signal, thereby selecting the output from the exclusive-OR gate 244 from the middle of the third quarter of the of the Baud period in the received signal up to the middle of the first quarter of the following Baud period, and selecting the output from the exclusive-OR gate 251 the remainder of the time. The multiplexer 26 thus delivers the data sequence $\{a_i\}$ from its output.

It has been shown above that the signal resulting from Wacx encoding takes the following values during the K-th Baud period: $b_K$ during the first quarter of the period; $-a_K$ during the second quarter; $-b_K$ during the third quarter; and $a_K$ during the fourth quarter. The waveform during the second half of each Baud period can thus be deduced from its waveform during the first half thereof by inversion. This symmetrical property is taken advantage of for receiving the Baud clock rate at the receiver end. This is done by performing a comparison over a period of several consecutive Baud periods. Two versions of the received signal are compared, with one of the vesions being delayed relative to the other by half of one Baud period. The versions are compared at intervals of half a Baud period, and half Baud periods in which the result of the comparison remains negative are taken as defining the second halves of the Baud periods in the received signal. In order for this type of clock recovery to work, it is necessary that the waveform inversion found within a given Baud period should not occur systematically between consecutive Baud periods. This condition is generally true, and in any case it can be enforced by scrambling the data prior to transmission.

Figure 3:
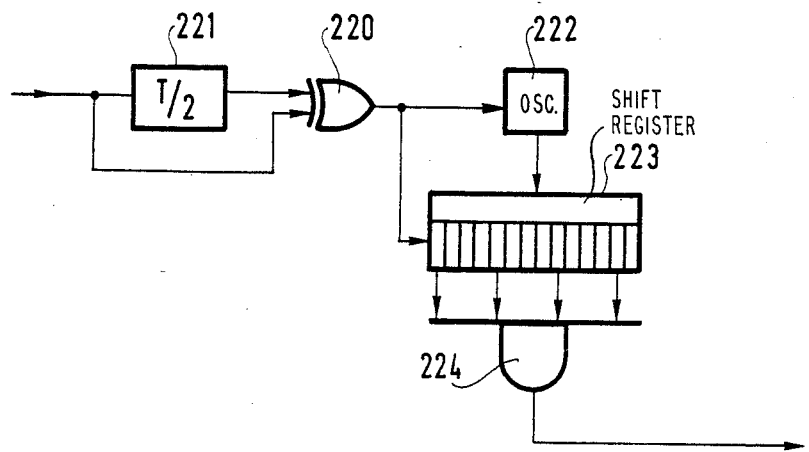
FIG. 3 shows a Baud rate recovery circuit used in the FIG. 2 receiver.

FIG. 3 shows the structure of the clock recovery circuit 22 which operates in this manner. This circuit comprises: an exclusive-OR logic gate 220 having two inputs connected to the output from the hard limiter 21, one of the inputs being connected directly thereto and the other being connected via a delay circuit 221 which introduces a delay of half a Baud period; an oscillator 222 having a period of one quarter of a Baud period and synchronized with a small delay to the transitions in the output from the exclusive-OR gate 220; a serial-in/parallel out shift register 223 which is clocked by the oscillator 222, which has its input connected to the output from the exclusive-OR gate 220; and a multiple input AND gate 224 having its inputs connected to every fourth output stage from the shift register 223 with the intervening three stages of output from the shift register 223 being skipped.

The exclusive-OR gate 220 performs two successive comparisons in each Baud period. In the first half of the time it compares the first half of the received signal element with the delayed second half of the preceding signal element. Its output should then be random. During the second half of each Baud period it compares the delayed first half of a signal element with the second half of the same signal element. The result of the comparison should then be non-equality giving a logic level 1 at the output from the comparator.

The oscillator 222 clocks the shift register 223 in such a manner as to cause a shift after a time of one quarter of a Baud period has elapsed which is the minimum time for which a signal resulting from Wacx encoding remains at the same level. The fact that the oscillator is synchronized with a slight delay relative to the transitions in the output signal from the exclusive-OR logic gate 220 ensures that the shift register 223 shifts only after the level at its input has become stable.

Figure 4:
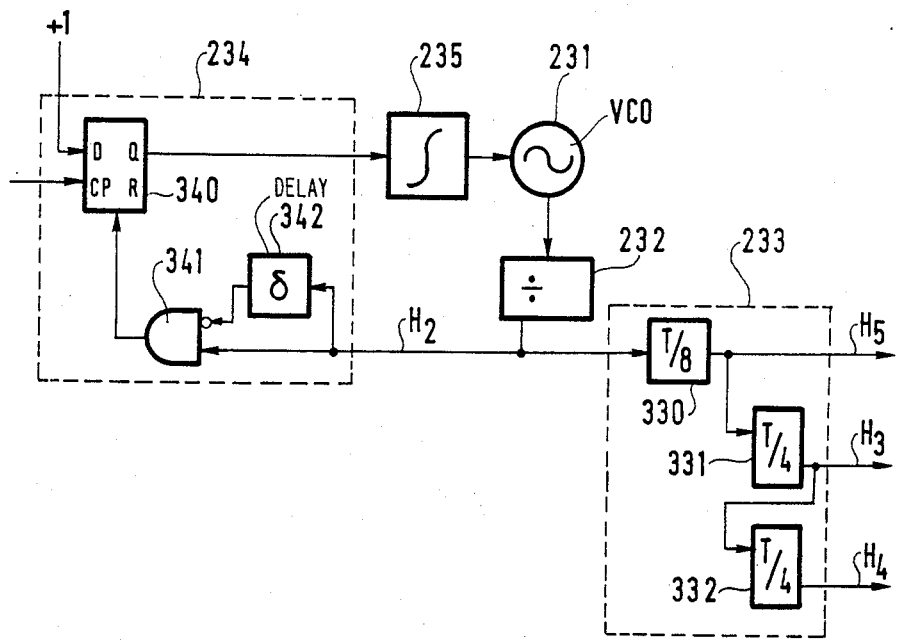
FIG. 4 shows a time base in the FIG. 2 receiver.

During each third and each fourth quarter of the Baud period, the AND gate 224 detects the passage of a pattern passing through the shift register 223 and having logic level one bits in every fourth position. The length of the register is chosen to ensure that is almost certain that there will be logic level zero bits passing through the register whereby the AND gate 224 delivers a periodic signal at the Baud rate and having logic level one during the third and fourth quarters of each Baud period and having logic level zero the rest of the time. This signal is used to synchronize the time base 23, with one embodiment thereof being shown in FIG. 4.

The time base is provided for a direct detection circuit 24 and for a differential decoder 25 having bistables which are triggered on positive fronts, ie. rising edges, in the signal applied to their clock inputs.

It mainly comprises a voltage controlled oscillator 231, a circuit for locking the phase of the oscillator 231 to the signal delivered by the Baud rate recovery circuit 22, a divider 232 generating a clock signal $H_2$ at the recovered Baud rate, and a circuit 233 for generating the sampling signals $H_3$ and $H_4$ which control the bistables in the direct detection circuit 24, and for generating a control signal $H_5$ for addressing the multiplexer 26.

The circuit for locking the phase of the voltage controlled oscillator 231 mainly comprises a phase comparator 234 which is triggered by positive fronts in the clock signal $H_2$ at the Baud rate as delivered by the divider 232 and in the signal generated by the clock recovery circuit 22, and an integrator circuit 235 which connects the output from the phase comparator circuit 234 to the control input of the voltage controlled oscillator 231.

The phase comparator 234 comprises a D-type bistable 340 which is triggered by positive fronts, which is set to one by positive fronts in the signal delivered by the clock recovery circuit 22 and which is set to zero by positive fronts in the Baud rate clock signal $H_2$ delivered by the divider 232. To do this, the bistable 340 has its D input set to a constant level one, its clock input CP connected to the output from the clock recovery circuit 22 and its reset to zero input R excited by pulses which are synchronous with the positive fronts in the clock signal $H_2$. These pulses are obtained by means of a two input AND gate 341 which receives the clock signal $H_2$ directly on one of its inputs and via a circuit 342 which provides a short delay followed by an inverter (not shown, but symbolized by small circle at the input to the AND gate 341).

The phase comparator reaches equilibrium when the pulses present on its two inputs are in quadrature. Since the signal generated by the clock recovery circuit 22 has its rising fronts in the middle of each Baud period, the clock signal $H_2$ then has its rising fronts at the beginning of each Baud period.

The circuit 233 for generating the signals $H_3$ and $H_4$ for sampling the received signal and the control signal $H_5$ for addressing the multiplexer 26 comprises: a first delay circuit 330 providing a delay of one eighth of a Baud period T/8 in the clock signal $H_2$ to generate the addressing control signal $H_5$ for the multiplexer 26, the transitions in this signal take place in the middle of the first and third quarters of the Baud period of the received signal; a second delay circuit 331 providing a delay of one quarter of a Baud period T/4 in the control signal $H_5$ to generate the signal $H_3$ for sampling the received signal in the middle of the second quarter of each Baud period; and a third delay circuit 332 providing a delay of one quarter of a Baud period T/4 in the sampling signal $H_3$ to generate the signal $H_4$ for sampling the received signal in the middle of the third quarter of each Baud period.

We claim:

1. A synchronous QPSK data transmission system of the type having a single carrier cycle per Baud period in which the signal during each Baud period represents two binary bits and can take one of four possible shapes defined by the functions:

$$\pm\text{sign }(\sin(2\pi t/T));\ \pm\text{sign }(\cos(2\pi t/T)),$$

characterized in that said system comprises:
sampling means for sampling said signal only during the second and third quarters of a Baud period; and
logic means for recognizing the shape of the signal from the sampled value during the third quarter of each Baud period and from the comparison of said sampled value with a sampled value taken during the second quarter of the same Baud period, and for determining the corresponding binary values from the received data.

2. A QPSK synchronous data transmission system of the type having a single carrier cycle per Baud period, wherein the signal in a Baud period encodes two binary bits and can take on any one of four possible shapes defined by the functions:

$$\pm\text{sign }(\sin(2\pi t/T));\ \pm\text{sign }(\cos(2\pi t/T)),$$

characterized in that said system includes a receiver having a clock recovery circuit, said clock recovery circuit including:
comparison means for comparing two versions of said signal, one delayed with respect to the other by a delay interval equal to half of a Baud period, and producing a first output signal level corresponding to coincidence between said two versions and a second output signal level corresponding to a difference between said two versions;
an oscillator producing a clock signal at four times the Baud frequency and synchronized to signal transitions produced by said comparison means;

a shift register for receiving output data from said comparison means and for serially shifting said data in response to said clock signal, said shift register having parallel outputs separated evenly from one another by four shift register stages; and a logic gate having multiple inputs connected to said parallel shift register outputs and providing an output signal representing the presence at all of said logic gate inputs of a signal representing said second output signal level from said comparison means.

3. A QPSK synchronous data transmission system of the type including a transmitter for transmitting a signal having a single carrier cycle per Baud period, wherein the signal in a Baud period encodes pairs of binary bits and can take on any one of four possible shapes defined by the functions:

$$\pm\text{sign}(\sin 2\pi t/T); \pm\text{sign}(\cos 2\pi t/T);$$

characterized in that said system includes a transmitter comprising:

selecting means for receiving a data signal to be transmitted and for providing said data signal as an output in the form of successive pairs of bits;

first precoding means with complementary outputs for differentially encoding one of the bits of each said pair;

second precoding means with complementary outputs for replacing the other bit of each said pair with the modulo-2 product of said other bit with the differentially encoded bit delivered by said first precoding means;

and multiplexer means for generating one of said four possible shapes by scanning the complementary outputs of said first and second precoding means.

4. A QPSK synchronous data transmission system according to claim 3, characterized in that it further includes a receiver comprising:

a direct detection circuit for sampling the received signal in the middle of the second and the third quarters of each Baud period; and a decoding circuit, said decoding circuit including: first decoding means for delivering the modulo-2 product of samples of the received signal taken in the middle of the second and third quarters of each Baud period; and a second decoding means for differentially decoding the samples of the received signal taken in the middle of the third quarter of each Baud period.

* * * * *